3,152,296
REGULATED POWER CONVERSION SYSTEM
George W. Meszaros, New York, N.Y., assignor to Bell
  Telephone Laboratories, Incorporated, New York,
  N.Y., a corporation of New York
      Filed Nov. 30, 1959, Ser. No. 856,118
             2 Claims. (Cl. 321—18)

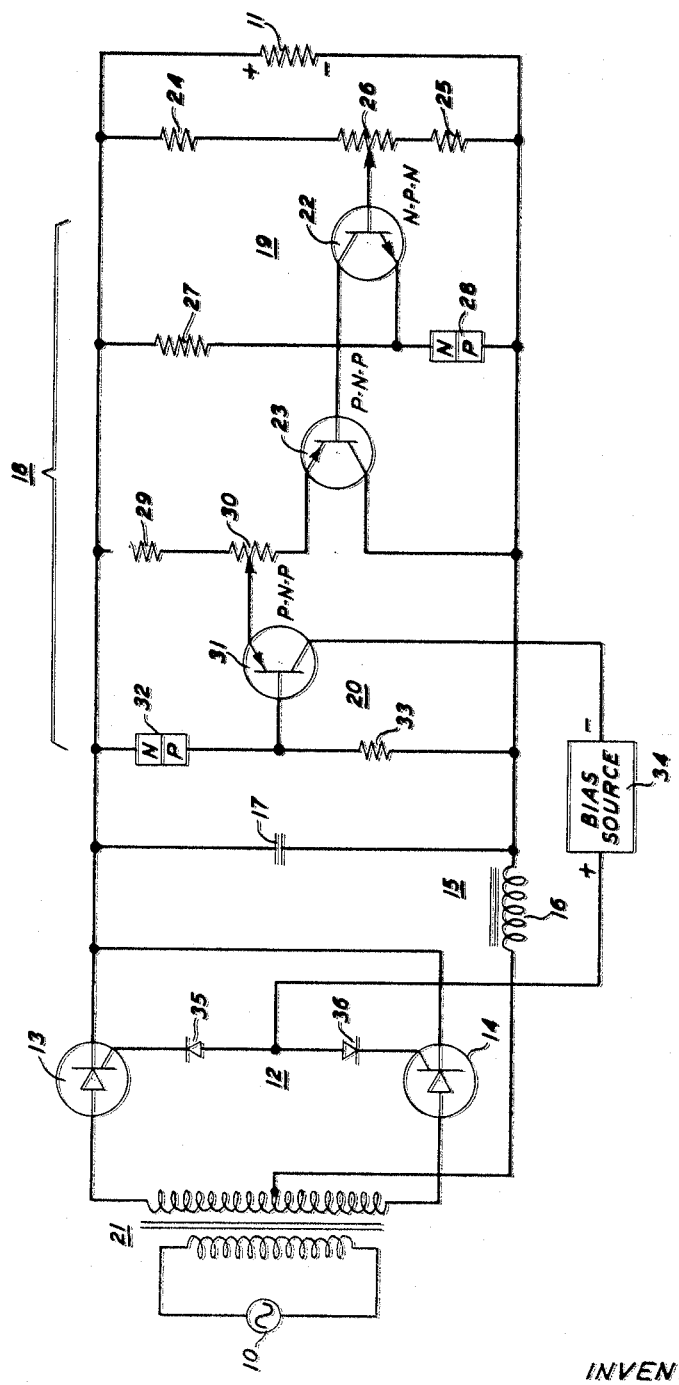

This invention relates to current supply apparatus and particularly to improvements in regulated power supplies.

One class of regulated current supply apparatus is arranged to accept current from an unregulated alternating-current source and to produce a regulated direct-current output. Such supplies involve rectification in addition to regulation and typically employ a thyratron or thyratron-like element for the rectifying device. This rectifying device may be either the well-known gas-filled thyratron or the relatively new solid-state three-terminal PNPN switch which has many thyratron-like characteristics. Such PNPN switches have been described by I. M. Mackintosh in the Proceedings of the Institute of Radio Engineers, vol. 46, No. 6, pages 1229 through 1235. Their use in various circuits and in particular as rectifiers having variable firing angles in a regulated power supply has also been described by R. P. Frenzel and F. W. Gutzwiller in Electronics, vol. 31, No. 13, pages 52 through 55, and by F. W. Gutzwiller in Control Engineering, vol, 6 No. 5, pages 113 through 119.

The three-terminal PNPN switch is a four-region semiconductor structure having electrical connections to both outer (emitter) regions and to one of the inner (base) regions. When these three-terminal PNPN switches are used as controlled rectifiers, they are functionally equivalent to a gas thyratron tube. Therefore, the regions having the electrical connections are designated the anode (outer P region), the cathode (outer N region), and the gate (usually the inner P region). When the anode is negative with respect to the cathode, the rectifier exhibits a very high impedance, blocking the flow of current in the anode circuit. Even when the anode is positive, but at a value less than that which will break down the switch and cause conduction, the controlled rectifier still blocks the flow of current until an appropriate firing signal is applied to the gate-cathode circuit. However, when there is a continuous current flowing through the gate-cathode junction, the magnitude of voltage between the anode and cathode required to break down the PNPN switch to cause conduction therethrough is dependent upon the magnitude of this continuous current. Curves of a representative PNPN switch showing this dependence are the curves in FIG. 3 of the above-mentioned Mackintosh article.

The duty cycle of a thyratron-like solid-state rectifier and the time of turn-on or onset of conduction are variable in accordance with the relative magnitudes and phases of the gate or control current and the operating voltages. Since there is a magnitude and/or phase relationship which will cause the thyratron-like semiconductor switch to conduct, it is possible to effect either magnitude or phase control, or both. One convenient way of controlling thyratron-like devices is in terms of the firing angle which may be defined as the product of the angular frequency of the input voltage to the power supply and the time of turn-on with respect to the time of zero value of the positively increasing input voltage. Thus, when this control of the time of turn-on is realized, the firing angle of the thyratron-like device is being controlled.

One method of controlling the firing angle of PNPN switches in a regulated power supply is by supplying a pulse of current through the gate-cathode junction of the switch at a time determined by the magnitude of the rectifier output voltage. This method not only requires a source to supply the pulse of current but also requires a means for synchronizing the time of occurrence of the pulse of current with the time of occurrence of the desired magnitude of input voltage. When these are synchronized and the required magnitudes exist, the switch will begin conduction and the average output voltage will be regulated by such control of the portion of the input signal cycle over which conduction occurs.

Regulated power supplies that use controlled rectifiers as the regulating device provide regulation with a slow response; that is, the controlled rectifier's time of turn-on can be controlled only every half-cycle of the input voltage. It is desirable to have a regulated power supply that has a response of regulation better or faster than that obtainable with a controlled rectifier.

The objects of the present invention are the simplification of the control of the firing angle of PNPN switches used in a rectifier circuit and the provision of nearly instantaneous response of regulation of the output voltage of the rectifier circuit.

In accordance with the invention, therefore, the simplification of the control of the firing angle is effected by controlling the magnitude of the current flowing through the gate-cathode junction of the switch over the complete cycle of the alternating-current input voltage rather than for a short time thereof as required for a pulse of current. This method of control does away with the necessity of synchronizing circuits.

Also, in accordance with the invention, a transistorized shunt regulator is provided to effect a nearly instantaneous response of the regulation of the output voltage of the rectifier. A transistorized shunt regulator provides a fast response to changes in load and line voltages and may be used even though the current therethrough may be momentarily large. This is true because this increased current through the shunt regulator will be reduced by the action of the controlled rectifier which has a response fast enough for this purpose.

These and other features and advantages of the invention will appear more clearly and fully upon consideration of the following specification taken with the drawing, the single figure of which is a schematic circuit diagram of a regulated power supply in accordance with the present invention.

As shown in the drawing, there is provided a regulator circuit for accepting current from an alternating-current source 10 whose magnitude may vary and for supplying a rectified current to a load 11, the impedance of which may vary. The alternating input current is rectified by a controlled rectifier 12 comprising rectifying three-terminal PNPN switches 13 and 14. The ripple filter 15, comprising a series inductor 16 and a shunt capacitor 17, suppresses alternating components of the rectified output. A detector 18, comprising a shunt regulator 19 and a control circuit 20, is provided for detecting load variations or line voltage variations. Shunt regulator 19 is provided to compensate for fast variations in the load or the line voltage, while the control circuit 20 is provided to control the firing angle of the switches 13 and 14, thereby compensating for slow variations in these voltages.

The alternating-current supply 10 is connected to the primary winding of a transformer 21. One outside terminal of the secondary winding of transformer 21 is connected to the PNPN switch 13, while the other outside terminal of the secondary winding is connected to PNPN switch 14. The center-tapped terminal of the secondary winding of transformer 21 is connected to the series inductor 16 of the ripple filter 15.

When the upper terminal of the secondary winding of transformer 21 is positive with respect to the center tap, a circuit for supplying current to the load 11 may be traced from this upper terminal through PNPN switch 13, load 11 and inductor 16 to the center tap of the secondary winding. A similar unidirectional current path may be traced from the lower terminal of the secondary of transformer 21 when it is positive with respect to the center-tapped terminal through PNPN switch 14, load 11 and inductor 16 to the center tap of the secondary winding.

These two current paths will exist alternately as first one PNPN switch conducts and then the other. The ability of these switches to conduct is determined by the relative magnitudes and phases of the voltages between their anode and cathode electrodes and of the currents through their gate-cathode junctions. The magnitudes of the gate-cathode currents are controlled by the control circuit 20 in response to the output voltage supplied to the load, thereby controlling the time of turn-on or the firing angle of these switches. This circuit 20 is made responsive to the average current through shunt regulator 19 which is connected effectively across load 11.

The shunt regulator 19, although shown as including transistors, may comprise vacuum tubes where the current to be carried is large enough to so warrant. The regulator 19 comprises transistors 22 and 23 together with a potential dividing network, including resistors 24 and 25 and potentiometer 26 connected in series across the output of the rectifier, a second potential dividing network, including a resistor 27 and a constant voltage PN junction diode 28, also connected in series across the rectifier output and a third potential dividing network including resistor 29 and potentiometer 30 connected in the emitter circuit of transistor 23.

The base of transistor 22 is connected to the wiper arm of potentiometer 26 and the emitter is connected to the junction of diode 28 and resistor 27. The input to transistor 22 is derived between the base and emitter electrodes of this transistor. Since the emitter is connected through the constant voltage diode 28 to the lower terminal of resistor 25, the input to transistor 22, and thereby shunt regulator 19, varies directly as the voltage between the wiper arm of potentiometer 26 and the lower terminal of resistor 25. This, in turn, varies directly as the output voltage of the rectifier. Since the emitter of transistor 22 is connected to a point of constant voltage with respect to the lower terminal of resistor 25, there is established a reference about which the input to transistor 22, and thereby regulator 19, may vary in accordance with the variations of the output voltage of the rectifier.

The output of the shunt regulator 19 is developed across resistor 29 and potentiometer 30 which are connected in the emitter circuit of transistor 23 acting as a direct-current amplifier. As the current through transistor 22, and thereby transistor 23, varies in accordance with the rectifier output voltage variations, the voltage across resistor 29 and potentiometer 30 varies. The voltage across resistor 29 and the portion of potentiometer 30 above its wiper arm appears as the input signal between the base and emitter electrodes of transistor 31 which forms the active element of control circuit 20. This voltage appears as the input of transistor 31 in much the same way as the voltage between the wiper arm of potentiometer 26 and the lower terminal of resistor 25 appears as the input to transistor 22.

The base of transistor 31 is connected to the junction of a constant voltage PN junction diode 32 and a resistor 33 which are connected in series across the rectifier output. Since the base is connected through the constant voltage diode 32 to the upper terminal of resistor 29, the input to transistor 31, and thereby to control circuit 20, varies directly as the voltage between the wiper arm of potentiometer 30 and the upper terminal of resistor 29. This, in turn, varies directly as the average current through these resistances, which is the average current through the shunt regulator 19.

As the voltage across resistor 29 and the upper portion of potentiometer 30 increases, the emitter of transistor 31 becomes less positive with respect to its base. Since transistor 31 is of the PNP type, this decreased potential will decrease the current flowing through the emitter-collector junction of this transistor.

The emitter-collector current of transistor 31 of the control circuit 20 is supplied by a direct-current bias source 34. This current, acting in conjunction with the anode-cathode voltage applied to the switches, determines the time of turn-on or the firing angle of the PNPN switches 13 and 14. The path of this current through the gate-cathode junctions of the switches is from the positive terminal of bias supply 34 through diodes 35 and 36, respectively, the gate-cathode junctions of PNPN switches 13 and 14 through resistor 29 and the upper portion of potentiometer 30, and through the emitter-collector path of transistor 31 to the negative terminal of bias source 34.

As discussed above, the magnitude of the gate-cathode current of switches 13 and 14 is varied in accordance with the rectifier output voltage variations. These voltage variations appear in the input to the shunt regulator 19. The shunt regulator 19 presents a path of reduced resistance to current flow as the output voltage increases. This path of reduced resistance tends to decrease this increased output voltage by allowing the increased current to flow therethrough. As this increased current flows through regulator 19, it produces an input to control circuit 20 across resistor 29 and potentiometer 30. This current will decrease the input to transistor 31, thereby decreasing the current flowing therethrough. Since the current flowing through transistor 31 is the same current that flows through the gate-cathode junction of switches 13 and 14, any increase or decrease in this current will change the firing angle of these switches.

As the firing angle of the switches is increased, the average current out of the rectifier decreases, thereby decreasing the increased current through shunt regulator 19 which has already caused the voltage produced across the load to be held substantially constant.

The regulator circuit operates to maintain this load voltage substantially constant for any fixed settings of potentiometers 26 and 30. Let it be assumed that the load voltage increases by a small amount due to an increase in line voltage or a decrease in load current, for example. The base of transistor 22 will become more positive with respect to its emitter, thereby increasing the collector-emitter current through transistor 22. When the current through transistor 22 increases, the emitter-base current through transistor 23 will also increase. This base current change will be amplified by the current gain of transistor 23 and appear as a change in its emitter-collector current. The emitter-collector current of transistor 23 flows through resistor 29 and potentiometer 30. This increased current will cause an increased voltage drop across these resistances.

The action of transistors 22 and 23 in shunt regulator 19 is such that the increased current will occur nearly simultaneously with the increased load voltage, thereby tending to decrease the current through the load which has the effect of keeping the load voltage constant.

The control circuit 20 will be responsive to the average current which flows through regulator 19 by way of resistor 29 and potentiometer 30. The assumed increase in load voltage produces an increase in this average current thereby making the emitter of transistor 31 less positive with respect to its base. As the emitter becomes less positive, the emitter-collector current of transistor 31 decreases. As this emitter-collector current is the same current that flows through the gate-cathode junction of switches 13 and 14, this gate-cathode current will also be decreased. With a decrease in the gate-cathode current, the anode-cathode voltage must reach a higher value before switch 13 or 14 will conduct. Therefore, the switch will conduct later in the cycle of the input voltage and the average current therethrough will be reduced, thereby reducing the rectifier output and effecting regulation.

On the other hand, when the output voltage decreases, the average current through regulator 19 will also decrease, thereby decreasing the voltage drop across resistor 29 and potentiometer 30. This decreased voltage drop, appearing as the input to control circuit 20, will cause transistor 31 to present a conduction path of decreased resistance. This decreased resistance will cause the current through the gate-cathode junctions of switches 13 and 14 to increase, thereby allowing these switches to conduct earlier in the cycle of the input voltage. This earlier conduction will result in an increased average output current from the rectifier, thereby increasing the voltage across the load and effecting the desired regulation.

What is claimed is:

1. In a regulated power supply for supplying direct current at substantially constant voltage to a load, the combination comprising a thyratron-like semiconductor device for rectifying current from an alternating-current source, said device having a variable time of turn-on with respect to the time of occurrence of the zero value of a positively increasing voltage from said source, said device having a firing angle that is the product of said time of turn-on and the angular frequency of said increasing voltage, said device having an anode, a cathode and a gate electrode, a source of gate-cathode current for said device, means for compensating for fast variations in the load voltage with respect to the time for the input voltage to complete one-half cycle, said compensating means providing a path of variable conductivity in shunt with said load, and means responsive to the average current through said compensating means for controlling the firing angle of said device by controlling the magnitude of said gate-cathode current.

2. A regulated rectifier comprising means for rectifying current from an alternating-current source including a thyratron-like semiconductor device having an anode, a cathode and a gate electrode, said device having a variable time of turn-on with respect to the time of occurrence of the zero value of a positively increasing voltage from said source, a circuit through which said rectified current is supplied to a load, a source of current wherein the current therefrom varies inversely as the voltage across said load, a conduction path for the current from said current source through the gate electrode to the cathode of said device, and a variable resistance in said conduction path wherein the resistance varies directly as the voltage across said load so that said current through said gate-cathode path of said device varies to control said time of turn-on.

References Cited in the file of this patent
UNITED STATES PATENTS

| | | |
|---|---|---|
| 2,065,280 | Koros et al. | Dec. 22, 1936 |
| 2,095,742 | Haller | Oct. 12, 1937 |
| 2,113,220 | Power | Apr. 5, 1938 |
| 2,250,102 | Klemperer | July 22, 1941 |
| 2,315,445 | Milarta | Mar. 30, 1943 |
| 2,443,638 | Potter | June 22, 1948 |
| 2,567,797 | Anderson | Sept. 11, 1951 |
| 2,592,615 | Stone | Apr. 15, 1952 |
| 2,693,572 | Chase | Nov. 2, 1954 |
| 2,751,545 | Chase | June 19, 1956 |
| 2,751,550 | Chase | June 19, 1956 |
| 2,942,172 | Holtje | June 21, 1960 |

FOREIGN PATENTS

| | | |
|---|---|---|
| 607,160 | Canada | Oct. 18, 1960 |

OTHER REFERENCES

"Solid State Thyratron Switches Kilowatts," Frenzel and Gutzwiller, Electronics, pages 52–55.